US008183875B2

(12) United States Patent
Cordeiro et al.

(10) Patent No.: US 8,183,875 B2
(45) Date of Patent: May 22, 2012

(54) SYSTEM AND METHOD FOR DETERMINING TOUCH POSITIONS BASED ON PASSIVELY-INDUCED POSITION-DEPENDENT ELECTRICAL CHARGES

(75) Inventors: Craig A. Cordeiro, Westford, MA (US); Bernard O. Geaghan, Salem, NH (US)

(73) Assignee: 3M Innovative Properties Company, Saint Paul, MN (US)

( * ) Notice: Subject to any disclaimer, the term of this patent is extended or adjusted under 35 U.S.C. 154(b) by 757 days.

(21) Appl. No.: 12/324,243

(22) Filed: Nov. 26, 2008

(65) Prior Publication Data

US 2010/0127717 A1    May 27, 2010

(51) Int. Cl.
*G01R 27/26* (2006.01)
*G06F 3/045* (2006.01)

(52) U.S. Cl. ......... 324/678; 324/662; 324/686; 345/174

(58) Field of Classification Search .................. 324/661, 324/662, 678, 686; 345/173, 174; 178/18.01–20.04
See application file for complete search history.

(56) References Cited

U.S. PATENT DOCUMENTS

| | | |
|---|---|---|
| 3,106,707 A | 10/1963 | Thompson |
| 3,999,012 A | 12/1976 | Dym |
| 4,087,625 A | 5/1978 | Dum |
| 4,263,659 A | 4/1981 | Hirata et al. |
| 4,293,734 A | 10/1981 | Pepper |
| 4,550,310 A | 10/1985 | Yamaguchi et al. |
| 4,631,355 A | 12/1986 | Federico et al. |
| 4,680,430 A | 7/1987 | Yoshikawa et al. |
| 4,698,460 A | 10/1987 | Krein et al. |
| 4,827,084 A | 5/1989 | Yaniv et al. |
| 4,929,934 A | 5/1990 | Ueda et al. |
| 4,954,823 A | 9/1990 | Binstead |

(Continued)

FOREIGN PATENT DOCUMENTS

JP    60-181913    9/1985

OTHER PUBLICATIONS

International Search Report, PCT/US2009/064681, PCT/ISA/210 Form, 3 pages, Jul. 2010.

(Continued)

*Primary Examiner* — Timothy J Dole
(74) *Attorney, Agent, or Firm* — Steven A. Bern

(57) ABSTRACT

Systems and methods determine the position of a touch on a surface of a device, such as a touch-sensitive device, by using passively-induced position-dependent electrical charges. In such a method, the position of a touching implement is determined on the sensing surface of a device. The method includes charging the sensing surface during a first time period by connecting all four corners of the sensing surface to a reference voltage, and over a second time period discharging two adjacent corners of the sensing surface into an integrator capacitor while connecting the two opposite corners to ground. The first and second time periods together form a charge/discharge cycle that is repeated a plurality of times, after which an output of the integrator capacitor is measured. This sequence is performed for each of the four pairs of adjacent corners of the sensing surface, resulting in four integrator capacitor output measurements, each of the four measurements being associated with a different sensing surface edge. The position of the touching implement on the sensing surface is then calculated using the four charge measurements.

15 Claims, 3 Drawing Sheets

U.S. PATENT DOCUMENTS

| | | | |
|---|---|---|---|
| 5,072,076 A | 12/1991 | Camp | |
| 5,365,461 A | 11/1994 | Stein et al. | |
| 5,374,787 A | 12/1994 | Miller et al. | |
| 6,043,810 A * | 3/2000 | Kim et al. | 345/173 |
| 6,239,389 B1 | 5/2001 | Allen et al. | |
| 6,275,047 B1 | 8/2001 | Zoellick | |
| 6,466,036 B1 | 10/2002 | Phillip | |
| 6,529,017 B2 | 3/2003 | Martin et al. | |
| 7,084,860 B1 | 8/2006 | Jaeger et al. | |
| 7,157,649 B2 | 1/2007 | Hill | |
| 7,254,775 B2 | 8/2007 | Geaghan et al. | |
| 7,567,240 B2 * | 7/2009 | Peterson et al. | 345/173 |
| 7,830,157 B2 | 11/2010 | Geaghan | |
| 7,863,909 B2 | 1/2011 | Keith | |
| 2002/0008526 A1 | 1/2002 | Martin et al. | |
| 2004/0104826 A1 | 6/2004 | Philipp | |
| 2005/0162408 A1 | 7/2005 | Martchovsky | |
| 2006/0022959 A1 | 2/2006 | Geaghan | |
| 2006/0207806 A1 | 9/2006 | Philipp | |
| 2006/0244732 A1 | 11/2006 | Geaghan | |
| 2006/0279548 A1 | 12/2006 | Geaghan | |
| 2006/0284639 A1 | 12/2006 | Reynolds | |
| 2007/0074913 A1 | 4/2007 | Geaghan | |
| 2007/0143059 A1 | 6/2007 | Moser | |
| 2007/0216657 A1 | 9/2007 | Konicek | |
| 2007/0257894 A1 | 11/2007 | Philipp | |
| 2007/0262966 A1 * | 11/2007 | Nishimura et al. | 345/173 |
| 2007/0291012 A1 | 12/2007 | Chang | |
| 2008/0142281 A1 | 6/2008 | Geaghan | |
| 2008/0252608 A1 | 10/2008 | Geaghan | |
| 2008/0266271 A1 | 10/2008 | Van Berkel et al. | |
| 2009/0046077 A1 | 2/2009 | Tanaka et al. | |
| 2009/0115742 A1 * | 5/2009 | Mamba et al. | 345/174 |
| 2009/0127003 A1 * | 5/2009 | Geaghan | 345/173 |
| 2010/0127717 A1 | 5/2010 | Cordeiro et al. | |

OTHER PUBLICATIONS

U.S. Appl. No. 11/612,799, Touch Sensor with Electrode Array, filed Dec. 19, 2006.

U.S. Appl. No. 61/017,451, Multiple Capacitance Measuring Circuits and Methods, filed Dec. 28, 2007.

* cited by examiner

SYSTEM AND METHOD FOR DETERMINING TOUCH POSITIONS BASED ON PASSIVELY-INDUCED POSITION-DEPENDENT ELECTRICAL CHARGES

This patent document is related to U.S. patent application Ser. No. 11/944,143 filed on Nov. 21, 2007, and entitled "System and Method for Determining Touch Positions Based on Position-Dependent Electrical Charges".

FIELD OF THE INVENTION

This invention relates to a system and method for determining the position of the touch of a finger or touching implement.

BACKGROUND

There are numerous approaches for sensing the location of the touch of a finger or a corded or free stylus on the surface of a touch-sensitive device, typically placed over the face of an electronic display or used as a free-standing touch tablet or off-display touch pad. Sensing methods have included resistive and capacitive sensing using resistive surface layers, as well as technology such as acoustic wave and inductive electromagnetic sensing.

Most recently, such touch-sensitive devices have been widely distributed in forms spanning various industries including but not limited to entertainment such as gaming, handheld and mobile applications, and a wide variety of presentation-directed industries such as business and educational applications.

SUMMARY

Various aspects of the present invention are directed to systems and methods for determining the position of the touch of a finger or touching implement based on passively-induced position-dependent electrical charges.

According to one aspect, the present invention is directed to a method for determining the position of a touching implement on the sensing surface of a device. The method includes charging the sensing surface during a first time period by connecting all four corners of the sensing surface to a reference voltage, and over a second time period discharging two adjacent corners of the sensing surface into an integrator capacitor while connecting the two opposite corners to ground. The first and second time periods together form a charge/discharge cycle that is repeated a plurality of times, after which an output of the integrator capacitor is measured. This sequence is performed for each of the four pairs of adjacent corners of the sensing surface, resulting in four integrator capacitor output measurements, each of the four measurements being associated with a different sensing surface edge. The position of the touching implement on the sensing surface is then calculated using the four charge measurements.

According to another aspect, the present invention is directed to an apparatus for determining the position of a touching implement on the sensing surface of a device. The apparatus includes a signal drive circuit, coupled to the surface of the device, to simultaneously drive all four corners of the sensing surface to a reference voltage over a first time period. The apparatus further includes a charge measurement circuit, coupled to the sensing surface, to passively induce a position-dependent electrical charge and to measure the position-dependent electrical charge by discharging two adjacent corners of the sensing surface into an integrator capacitor while simultaneously connecting the two opposite corners to ground during a second time period alternated with the first time period. The charge accumulated in the integrator capacitor indicates a coordinate on the sensing surface for establishing the position of the touching implement.

According to yet another aspect, the invention concerns a method for calibrating a touch measurement system for determining the position of a touching implement on the sensing surface of a device. The method includes connecting all four corners of the sensing surface to a reference voltage during a first time period, and responsive to completing the first time period, discharging two adjacent corners of the sensing surface into an integrator capacitor while connecting the two opposite corners to ground during a second time period. The first and second time periods are repeated a predetermined number of times, and the voltage output of the integrator capacitor is compared to a selected voltage range. Adjustments to the time periods are determined based on the following: the second time period is decreased if the voltage output of the integrator capacitor is below the selected voltage range, and the second time period is increased if the voltage output of the integrator capacitor is above the selected voltage range. In response to adjusting the second time period, the first time period may be adjusted so that the sum of the two time periods remains constant. After adjustments, the process is repeated to determine if additional adjustments should be made.

In different examples, the disclosure teaches use of passive gradient processing, methods of adjusting parameters of a passive gradient sensor to optimize gradient magnitude for determining the position of the touching implement accurately, and a variety of touch displays and touch implements.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the detailed description of various embodiments of the invention in connection with the accompanying drawings, in which.

Figure 1:
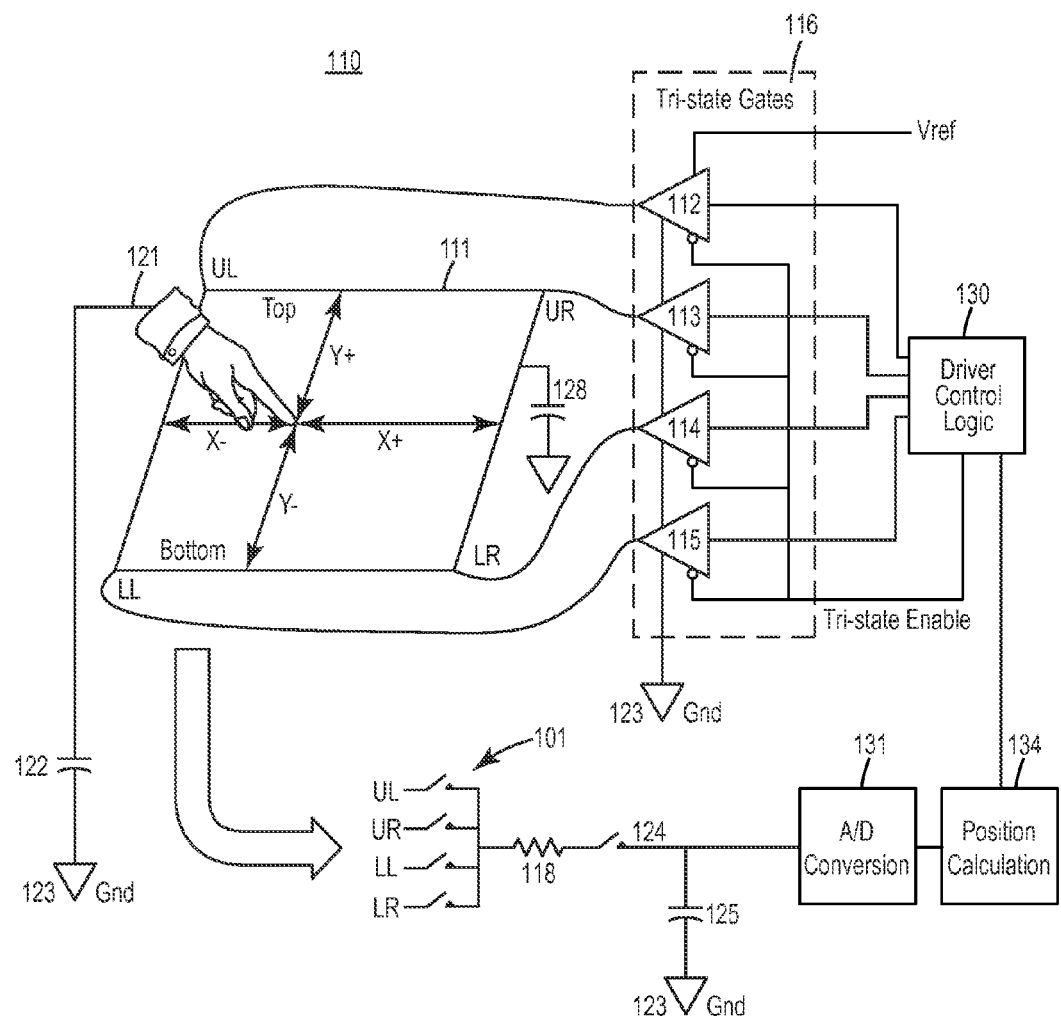
FIG. 1 illustrates a circuit arrangement for determining a touch position in accordance with an embodiment of the present invention.

While the invention is amenable to various modifications and alternative forms, specifics thereof have been shown by way of example in the drawings and will be described in detail. It should be understood, however, that the intention is not necessarily to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to a variety of different types of systems and devices having contact-sensitive surfaces that are engaged to convey information. Various implementations of the present invention have been found to be particularly suited for locating a specific surface region (or surface coordinate) at which contact has been made. While the present invention is not necessarily limited to such implementations, various aspects of the invention may be appreciated through a discussion of various examples using this context.

The present invention relates to systems and methods for determining the position of a touching implement, such as a stylus or finger, on a sensing surface of a device. In such an application, a position-dependent electrical charge is induced on the touch implement that has engaged an area on the sensing surface of the device. This may involve holding one or more corners of the sensing surface at a fixed potential (for example, ground) and allowing the potential on the other corners of the sensing surface to be determined based on R-C delays across the sensing surface. For example, a reference voltage may be applied to all four corners for a time duration $\Delta t_1$, followed by grounding two adjacent corners while discharging the opposing two adjacent corners into an integrator capacitor for a time duration $\Delta t_2$, where $\Delta t_2$ is less than the time required to discharge the integrator capacitor through the resistance of the sensing surface. The process may be repeated a number of times until the voltage on the integrator capacitor stabilizes at a relatively constant voltage. The sequence may be repeated again for each of the four pairs of adjacent corners, thereby resulting in four integrator capacitor measurements that can be used to calculate the position of the touching implement.

In accordance with certain embodiments, a signal drive circuit and a charge measurement circuit are used to induce the position-dependent electrical charge and to measure the charge on the sensing surface, which indicates touching implement location information. In certain embodiments, the sensing surface is uniformly charged, and the position-dependent charge is induced on the integrator capacitor during discharge of the sensing surface through the sensed corners. A signal processing circuit responds to the position-dependent electrical charge measurements by locating the area on the sensing surface of the device as indicated by the position-dependent electrical charge. In this context, certain embodiments permit for position-dependent electrical charges to respectively correspond to expected engagement areas on the sensing surface. In a related specific embodiment, the surface is a contact-alterable impedance plane that when contacted, permits the signal generation and signal processing circuits to respond to and process the position-dependent electrical charge and thereby identify the contacted surface area.

Also in accordance with the present invention, the location of the surface engagement (for example, contact or touch) is automatically determined using at least one sensing channel as part of the signal processing circuit. For example, a specific embodiment of the present invention uses four sensing channels (for example, one at each adjacent pair of corners of the surface). Other specific embodiments of the present invention determine two-dimensional touch position using fewer than four sensing channels, for example a single sensing channel.

FIG. 1 exemplifies a system 110 which uses gradient touch detection. This system 110 uses a single sensing channel, via integration capacitor 125, to locate touches on an electrically resistive (sensing surface) layer 111. To generate voltage gradients and current flowing in at least one direction, drive circuitry 116 includes tri-state logic drivers (112, 113, 114, and 115) to drive the resistive layer at four points, for example the upper and lower left and right corners UL, UR, LR and LL. The drive signals are binary, for example where logic high corresponds to $V_{ref}=+V_{cc}$ such as 3 to 5 volts, and logic low corresponds to Gnd=0 volts.

System 110 works by establishing a position-independent charge on the capacitance 122 of finger/body 121. A position-dependent portion of charge on capacitance 122 is then transferred to integrator capacitor 125 ($C_{int}$). By appropriately driving and sensing the four corners and analyzing corresponding position-dependent electrical charges, locations of contact engagements can be determined, for example, in the form of X-Y Cartesian coordinates.

In an example embodiment, a uniform (position-independent) voltage is induced across the sensing surface between a "sensed" side and a "driven" side during a charge period. For example, the sensed side may be the side defined by adjacent corners UR and LR, and the driven side defined by opposite adjacent corners UL and LL. During the discharge period, the corners of the sensed side (UR/LR) are connected to the integration capacitor 125 through resistance 118 via switches 101, and the corners of the driven side (UL/LL) are grounded. Charge periods and discharge periods are alternated during a measurement sequence and the voltage on integrator capacitor 125 builds up with each charge and discharge cycle until a predetermined number of drive cycles is accomplished, ending a measurement sequence. At the end of the sequence, the voltage signal from the charge accumulated in the integrator capacitor is then measured, for example using an analog to digital converter (ADC) 131.

This sequence is repeated four times so that each side is sensed and a touch position calculation can be made. The measured output voltage of the integrator capacitor 125 includes the variable effects of the touching implement 121 applied to the sensing surface 111, such effects being proportional to the distance of the touching implement relative to the sensed side. Charge from the touch capacitance is discharged to each side proportional to a current divider formed by the difference in resistance from the point of touch and the two sides. The raw location of the touching implement is computed from the ratio of the touch capacitance sensed at the opposite sides of each direction (X and Y) on the sensing surface. For example, when sensing the side defined by UR/LR, an X+ measurement is made, when sensing the side defined by UL/LL, an X− measurement is made, when sensing the side defined by UL/UR, a Y+ measurement is made, and when sensing the side defined by LL/LR, a Y− measurement is made. Table 1 shows four sequential signal combinations, referred to Sequence 1.

TABLE 1

| | | Sequence 1 | | | |
|---|---|---|---|---|---|
| Measurement | UL | UR | LL | LR | Calculate |
| X+ | Gnd | sensed | Gnd | sensed | |
| X− | sensed | Gnd | sensed | Gnd | X position |
| Y+ | sensed | sensed | Gnd | Gnd | |
| Y− | Gnd | Gnd | sensed | sensed | Y position |

With reference to FIG. 1 and Table 1, a measurement begins with the inputs of tri-state drivers 112, 113, 114, and 115 being driven by driver control logic 130 with the same reference voltage $V_{ref}$. The outputs of the four tri-state drivers are simultaneously enabled so that their output voltages are applied to the sensor 111 for a first time period. At the end of the first time period, two adjacent corners are connected to ground 123 (Gnd) while the opposite two adjacent corners are sensed. By grounding the two corners that are not being sensed, a (non-linear) voltage gradient is generated across the resistive plane of the sensor 111 from one side to the other. A touching implement 121 couples from sensor 111 to ground 123 via capacitance 122, ($C_{122}$), which becomes charged to a reference voltage. A position-dependent portion of charge on $C_{122}$ is then transferred to an integrator capacitor 125, resulting in a voltage on capacitor 125 that is a function of the ratio of distances between the touched point and the sensed side vs. the distance between the touched point and the reference (grounded) side of the sensing surface. Table 1 indicates a measurement sequence that allows X and Y positions to be calculated.

As indicated, when the corners of the sensing surface are isolated from the drive voltages, switches 101 are used to connect the two adjacent sensing corners to the integration capacitor 128 while the two adjacent corners opposite of the sensing corners are grounded. At the same time, switch 124 is closed and the charge being held on the body capacitance 122 is transferred through the sensed side and to the integrator capacitor 125. Switch 124 is optionally provided as a pulse width modulation gate.

Figure 2A:
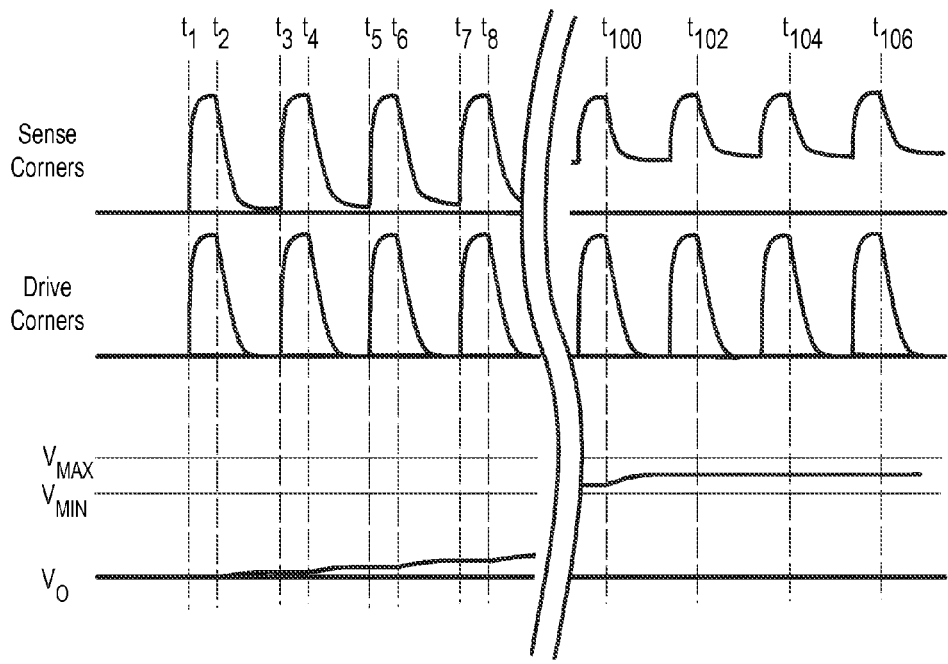
FIG. 2(a) illustrates a timing diagram useful for explaining the operation of the circuit arrangement of FIG. 1 in accordance with an embodiment of the present invention.
Figure 2B:
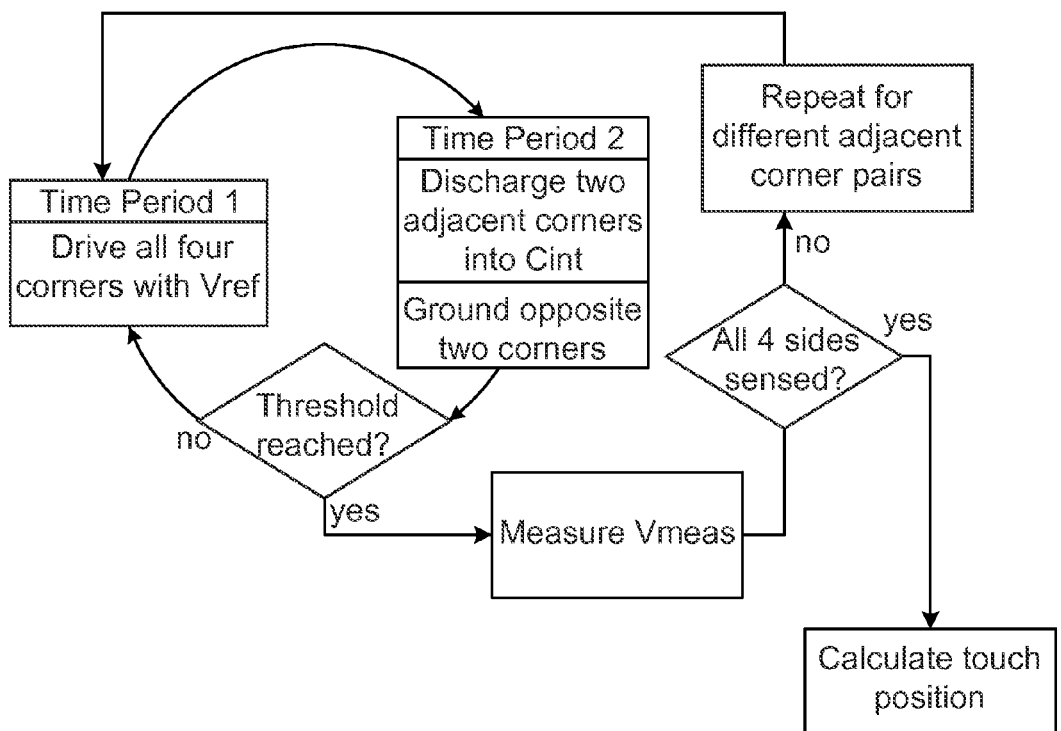
FIG. 2(b) illustrates a flow diagram useful for explaining the operation of the circuit arrangement of FIG. 1 in accordance with an embodiment of the present invention.

The charging of capacitance 122 and charge transfer to integrator capacitor 125 may be repeated a predetermined number of times to build voltage on capacitor 125 to a stable level, discussed further with respect to FIGS. 2(a) and 2(b). The total charge accumulated by the integrator capacitor, as represented by integrator output voltage $V_{int}$, is then measured by analog to digital conversion circuits 131, and the resulting measured value is stored for later position calculations by a processor 134. The integrator capacitor 125 can then be reset to an initial state, typically 0 volts.

FIG. 2(a) illustrates timing plots to exemplify the signal generation and processing relative to the sensor 111 of FIG. 1. The first line of FIG. 2(a) shows a sequence of charging and discharging cycles due to the application of sensor drive pulses to the sensing surface 111 at a pair of sense corners. The second line of FIG. 2(a) shows a sequence of charging and grounding cycles due to the application of sensor drive pulses to the sensing surface 111 at a pair of corners opposite the sensed corners, termed the drive corners. During a first time period from $t_1$ to $t_2$, a reference voltage is applied to the sensed corners and the drive corners. At time $t_2$, the driver corners are connected to ground, and the sensing surface is discharged into the integrator capacitor $C_{int}$ through the sensed corners for a second time period from $t_2$ to $t_3$. The third line of FIG. 2(a) shows the accumulation of voltage in the integrator capacitor $C_{int}$ during each discharge cycle. The first and second time periods are repeated for a fixed number of cycles, after which the voltage on $C_{int}$ has reached a stable value in a measurable range, indicated by $V_{min}$ and $V_{max}$. For the sake of illustration, only the initial four pulse cycles ($t_1$ through $t_8$) and four of the final pulse cycles (indicated by way of example as $t_{100}$ through $t_{106}$) are shown in FIG. 2(a), separated by a break indicating that additional pulses are required to bring $C_{int}$ to a stable voltage level (which is reached after time $t_{102}$). At the end of the pulse cycling, the voltage output of $C_{int}$ is measured ($V_{meas}$) and the integrator capacitor is discharged back to the starting voltage, $V_o$, for example 0 volts. It will also be appreciated that a new cycle can be started without discharging the integrator capacitor back to the starting voltage, so long as the new starting voltage is known. The pulse cycling sequence may then be repeated for a different pair of sensed corners until measurements have been made for all four sides of the sensor, allowing the touch position to be calculated.

The period of the charge/discharge cycle (for example, $t_3-t_1$) is preferably held constant to provide a fixed integration period and a predictable electromagnetic radiation fundamental frequency. The duty cycle, determined by the ratio of first and second time periods in a charge/discharge cycle (for example, $(t_2-t_1)/(t_3-t_1)$), may be varied to adjust $V_{meas}$ to be within the desired range between $V_{max}$ and $V_{min}$. The time constant of touch capacitance 122 (and parasitic capacitance 128) during the discharge period vary with the impedance of the surface of sensor 111, touch capacitance 122, and parasitic capacitance 128. The impedance of sensor 111 and the parasitic capacitance 128 remain relatively constant, but as the location of touch capacitance 122 on sensor 111 is varied, the relative time constant discharging toward the sensing channels versus the driven channels is changed.

The measurement channel, and its integrator capacitor 125, may be kept within desired operating range by using an algorithm that changes the duty cycle of sensor drive pulses in each sequence to yield a desired range of $V_{int}$ final levels based on the measured $V_{int}$ level of the previous sequences.

The allowed charge time $\Delta t_1=(t_2-t_1)$ (first time period) may be sufficient to allow full charging of the surface of sensor 111 to a uniform voltage, for example $\Delta t_1$ may be several (3 to 6) time constants. Discharge time $\Delta t_2=(t_3-t_2)$ (second time period) is not sufficient to allow full discharging. This can be accomplished by setting the first time period sufficient for the maximum possible capacitance. Discharge time $\Delta t_2$ may then be adjusted as required to cause the $V_{int}$ stable point to be between $V_{max}$ and $V_{min}$. This may be done by first selecting the value of $C_{int}$, and then prior to touching, executing an algorithm whereby the period of the drive and measurement pulses is held constant while the duty cycle is varied as required to adjust $V_{int}$ levels. Minimum and maximum values of the first and second time periods may be pre-established based on known system parameters including minimum and maximum levels of the touch capacitance and parasitic capacitance, $C_{int}$ capacitance, sensor impedance, and driver impedance. Alternatively, the first and second time periods may be established through a calibration procedure.

In an exemplary calibration procedure, the pulse and measurement cycles described above are performed a predetermined number of times, and the output voltage of integrator capacitor 125 is compared to a selected voltage range. If the output voltage is within the range, the first and second time periods may be maintained without adjustment (pending the possibility of adjustment upon repeating the procedure using a different pair of adjacent sensing corners). If the voltage output of the integrator capacitor is above the selected voltage range, the first time period is increased and the second time is decreased, and the calibration procedure is repeated. If the voltage output of the integrator capacitor is below the selected voltage range, the first time period is decreased and the second time is increased, and the calibration procedure is repeated. In exemplary embodiments, the adjustments to the first and second time periods are performed so that the sum of the first and second time periods remains constant. The effect is to keep the pulse width drive frequency the same while varying the duty cycle. In practice, adjustments to the length of the first time period may be freely made without significantly affecting touch position measurements so long as the duration is sufficient to fully charge the sensing surface.

FIG. 2(b) summarizes the drive/discharge cycling and measuring process for the sensor 111 of FIG. 1 and as exemplified by the timing plots of FIG. 2(a). In the step of determining whether a threshold has been reached, the threshold may be a number of drive/discharge cycles during touch measurement, or any other suitable threshold parameter.

When measurements are completed for all four sides of the sensing surface the measurements, denoted X+, X−, Y+, and Y−, can be used in a position calculation to determine the touch coordinates. First, baseline (no-touch) levels of all measurements are subtracted from current measurements to determine changes using the following equations to determine the Cartesian coordinates of the raw, unscaled touch position, Xt and Yt:

$$Xt=(X+)/((X+)+(X-)),\quad\text{(Equation 1)}$$

$$Yt=(Y+)/((Y+)+(Y-)),\quad\text{(Equation 2)}$$

Capacitance measurements will include parasitic capacitance coupling all parts of the sensor to ground, which is present in the system at all times whether the sensor is being touched or not. The effects of parasitic capacitance are eliminated by measuring baselines for all parameters (X+, X−, Y+, Y−) when there is no touch on the sensor. These no-touch capacitance values are subtracted from all subsequent measurements to eliminate the effects of the constant parasitic capacitance. The discussions of capacitance measurement in this patent application assume that baseline parasitic capacitance is subtracted from all capacitance measurements.

Gradients are dependent on parameters of sensor 111 surface including parasitic capacitance magnitude and distribution, surface resistance, touch capacitance, $C_{int}$ capacitance, and frequencies of operation. Sensitivity to a touch (position of an incremental capacitance due to a touch) depends on the presence of a gradient across the sensor surface. Attenuation that induces charge gradients is caused largely by R-C attenuation between the sensor sheet resistance (R) and parasitic capacitance (C). Attenuation of the applied signals causes a touch capacitance to be measured differently by the four measurement circuits, and the differences in measurement are used to calculate the touch position. For example, if the sensor surface were a copper sheet with essentially 0.0 Ohms from UL to LR, no gradient would be generated between UL and LR when UL is driven by its corresponding signal driver circuit. Thus, a 10 pf capacitance change due to a touch near LR would be measured as 10 pf with the signal driver circuit attached directly to LR, and it would also be measured as 10 pf with the same signal driver circuit attached to the opposite corner of the sensor surface. The presence of a touch is measurable, but given no difference in measurements, the position of the touch cannot be calculated. On the opposite end of the spectrum, if the sheet resistance of sensor were 100K ohms/square, and parasitic capacitance were 10,000 pf, evenly distributed across the sensor surface, then a signal of 1 MHz generated by the signal driver circuit onto corner UL would be attenuated to near zero within one-quarter of the distance across the sensor surface. Thus, a touch near the middle of the sensor surface would register negligible difference at all of the four measurement circuits, due to excessive attenuation. However, if the measurement frequency were reduced from 1 MHz, a frequency could be found that would provide an optimal gradient across the 100K Ohms/square sensor surface described above. Optimal passive attenuation results in a maximum gradient difference across the full area of the sensor. For certain applications, preferably the gradient is also linear.

Some sensor impedance parameters vary with the sensor design and with its surroundings. For example, placing a sensor near a grounded chassis or placing a metal bezel over the sensor periphery will change sensor capacitance to ground. If sensor and its drive signals are matched so an adequate level of passive attenuation is achieved, touch performance may be adequate and conventional calibration methods may be used. If sensor and signals do not match, one or more parameters such as frequencies of applied signals may be adjusted to achieve desired attenuation curves, as described in this document.

Figure 3:
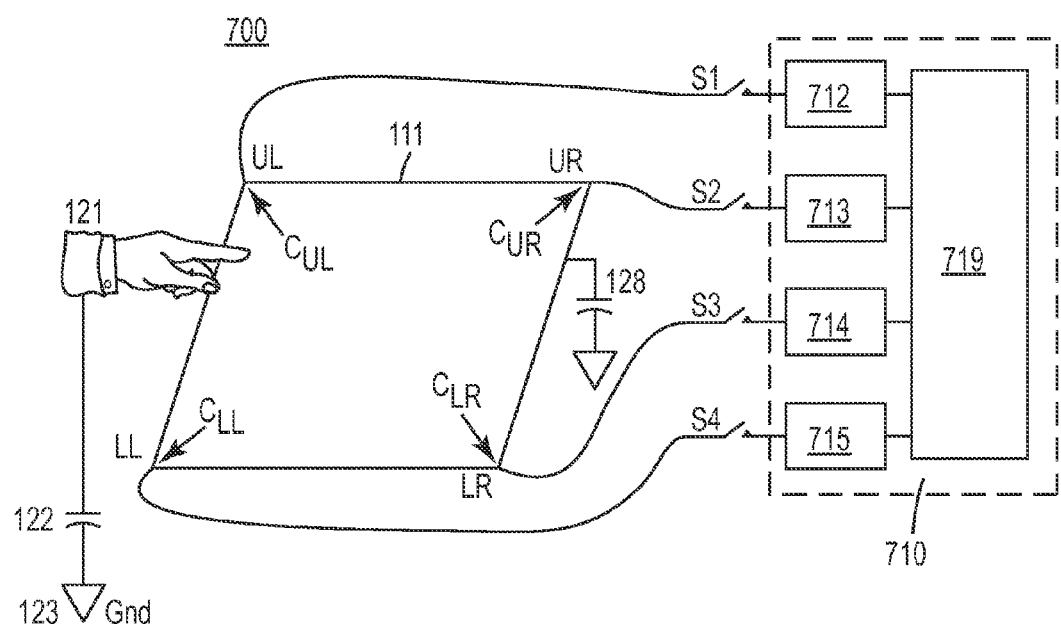
FIG. 3 illustrates another circuit arrangement for determining a contact position on a surface, also in accordance with an embodiment of the present invention.

The various embodiments described above are provided by way of illustration only and should not be construed to limit the invention. Figures are not drawn to scale. Based upon the above discussion and illustrations, those skilled in the art will readily recognize that various modifications and changes may be made to the present invention without strictly following the exemplary embodiments and applications illustrated and described herein. For example, for those systems illustrated above with an operational-amplifier-based integrator and a switch connected to its summing junction, other capacitance measuring circuits could be used; such measuring circuits include one or more of: an integrating capacitor connected to ground, Cypress PSOC™ circuits, circuits described in co-pending and co-assigned patent application Ser. No. 11/612,790, 3M Touch Systems Inc.'s SMT3 or EXII product, or other known ratio-of-capacitance controllers with series switches added to isolate each channel (as shown in FIG. 3), circuits described in U.S. Pat. No. 6,466,036 (Quantum), and, where only one channel is active at a time, a capacitance-to-frequency converter such as discussed in U.S. Pat. No. 4,954,823. Each of the above mentioned patent documents is fully incorporated by reference.

Examples are given pertaining to measuring position on a 2-dimensional surface. It is apparent that the circuits and methods can also be applied to measuring position on a scroll wheel or a 1-dimensional "slider".

Example circuits are simplified, and are not intended to limit alternative implementations. For example, tri-state circuits 116 controlled by logic 130 may be implemented using parallel input/output (PI/O) ports controlled by a microcontroller. Measurement circuits are referenced to ground, although alternatives such as $V_{cc}$ or $V_{cc}/2$ references may be preferable in some circuits. Or, the measurement reference and drive voltages may be changed periodically, to alternate between measuring positive-going pulses and negative-going pulses. This technique can reduce the effect of low-frequency noise, as described in co-assigned and co-pending patent application Ser. No. 11/612,790.

Also, it will be appreciated that although specific features of the invention are shown in some drawings and not others, this is for convenience only as each feature may be combined with one or more of the other features as embraced by the teachings herein. Such modifications and changes do not depart from the true spirit and scope of the present invention, which is set forth in the following claims.

What is claimed is:

1. A method for determining the position of a touching implement on a sensing surface of a touch-sensitive device, the method comprising:

(a) over a plurality of cycles of first and second time periods,
        connecting all four corners of the sensing surface to a reference voltage during the first time period, and during the second time period, discharging two adjacent corners of the sensing surface into an integrator capacitor while connecting the two opposite corners to ground;

(b) after the plurality of cycles, measuring an output of the integrator capacitor;

repeating steps (a) and (b) for each of the four pairs of adjacent corners of the sensing surface, resulting in four integrator capacitor output measurements, each of the four measurements being associated with a different sensing surface edge; and calculating the position of the touching implement on the sensing surface using the four charge measurements.

2. The method of claim 1, wherein the ratio between the first and second time periods is fixed.

3. The method of claim 2, further comprising varying the sum of the first and second time periods so that the measured output of the integrator capacitor is within a predetermined range after a predetermined number of cycles.

4. The method of claim 1, wherein the sum of the first and second time periods is fixed.

5. The method of claim 4, further comprising varying the ratio of the first and second time periods so that the measured output of the integrator capacitor is within a predetermined range after a predetermined number of cycles.

6. The method of claim 1, wherein the sum of the first and second time periods is in a range of about 0.5 microseconds to 5 microseconds.

7. The method of claim 1, wherein the plurality of cycles includes at least 100 cycles.

8. The method of claim 1, wherein the duration of the first time period is sufficient to charge the sensing surface to the reference voltage.

9. The method of claim 1, wherein the duration of the second time period is less than the time required to fully discharge the sensing surface from the reference voltage to zero volts.

10. An apparatus for determining the position of a touching implement on the sensing surface of a device, comprising:

a signal drive circuit, coupled to the surface of the device, to simultaneously drive all four corners of the sensing surface to a reference voltage over a first time period; and a charge measurement circuit, coupled to the sensing surface, to passively induce a position-dependent electrical charge and to measure the position-dependent electrical charge by discharging two adjacent corners of the sensing surface into an integrator capacitor while simultaneously connecting the two opposite corners to ground during a second time period alternated with the first time period, the charge accumulated in the integrator capacitor indicating a coordinate on the sensing surface for establishing the position of the touching implement.

11. The apparatus of claim 10, further comprising switches to couple each of the four corners of the sensing surface to the charge measurement circuit.

12. The apparatus of claim 11, further comprising a pulse width modulation gate disposed between the switches and the integrator capacitor.

13. The apparatus of claim 10, wherein the duration of the first time period is sufficient to charge the sensing surface to the reference voltage.

14. The apparatus of claim 10, wherein the reference voltage is in a range of about 3 to 5 volts.

15. The apparatus of claim 10, wherein the duration of the second time period is less than the time required to fully discharge the sensing surface from the reference voltage to zero volts.

\* \* \* \* \*